United States Patent
Mazumder et al.

(10) Patent No.: US 11,994,651 B2
(45) Date of Patent: May 28, 2024

(54) ANTI-REFLECTIVE TRANSPARENT OLEOPHOBIC SURFACES AND METHODS OF MANUFACTURING THEREOF

(71) Applicants: Corning Incorporated, Corning, NY (US); FUNDACIÓ INSTITUT DE CIÈNCIES FOTÒNIQUES, Castelldefels (ES); INSTITUCIÓ CATALANA DE RECERCA I ESTUDIS AVANÇATS, Barcelona (ES)

(72) Inventors: Prantik Mazumder, Ithaca, NY (US); Valerio Pruneri, Castelldefels (ES); Juan Rombaut, Sant Cugat del Valles (ES)

(73) Assignees: FUNDACIÓ INSTITUT DE CIÈNCIES FOTÒNIQUES (ES); INSTITUCIÓ CATALANA DE RECERCA I ESTUDIS AVANÇATS (ES)

( * ) Notice: Subject to any disclaimer, the term of this patent is extended or adjusted under 35 U.S.C. 154(b) by 32 days.

(21) Appl. No.: 17/601,505

(22) PCT Filed: Mar. 31, 2020

(86) PCT No.: PCT/US2020/025880
§ 371 (c)(1),
(2) Date: Oct. 5, 2021

(87) PCT Pub. No.: WO2020/210079
PCT Pub. Date: Oct. 15, 2020

(65) Prior Publication Data
US 2022/0179126 A1    Jun. 9, 2022

Related U.S. Application Data

(60) Provisional application No. 62/832,410, filed on Apr. 11, 2019.

(51) Int. Cl.
G02B 1/118 (2015.01)
C03C 17/32 (2006.01)
(Continued)

(52) U.S. Cl.
CPC ............ *G02B 1/118* (2013.01); *C03C 17/32* (2013.01); *C03C 17/3639* (2013.01);
(Continued)

(58) Field of Classification Search
CPC ............ C03C 15/00; C03C 17/06–10; C03C 2218/34
See application file for complete search history.

(56) References Cited

U.S. PATENT DOCUMENTS

2011/0065049 A1    3/2011    Kushibiki et al.
2011/0088771 A1    4/2011    Lin et al.
(Continued)

FOREIGN PATENT DOCUMENTS

CN    101727010 A    6/2010
CN    102044593 A    5/2011
(Continued)

OTHER PUBLICATIONS

Chinese Patent Application No. 202080028090.9, Office Action, dated Jan. 29, 2023, 5 pages Chinese Patent Office.
(Continued)

*Primary Examiner* — Alex A Rolland

(57) ABSTRACT

A method for fabricating a structured surface, includes: providing a transparent substrate; disposing a dewettable film over the substrate; annealing the dewettable film to form a plurality of islands; forming a coating over the plurality of islands; and etching the plurality of islands to form a structured array of surface features in the coating. A structured polymer and/or structured glass, includes: a structured array of surface features, such that the structured array of surface features has at least one dimension in a range of 0.5 nm to 5000 nm.

17 Claims, 8 Drawing Sheets

(51) Int. Cl.
   *C03C 17/36*   (2006.01)
   *C03C 17/38*   (2006.01)
   *C09D 5/00*    (2006.01)
   *C09D 179/08*  (2006.01)
   *C09K 13/04*   (2006.01)

(52) U.S. Cl.
   CPC ...... *C03C 17/3649* (2013.01); *C03C 17/3657* (2013.01); *C03C 17/38* (2013.01); *C09D 5/006* (2013.01); *C09D 179/08* (2013.01); *C09K 13/04* (2013.01); *C03C 2217/73* (2013.01); *C03C 2218/156* (2013.01); *C03C 2218/33* (2013.01)

(56) References Cited

U.S. PATENT DOCUMENTS

| | | |
|---|---|---|
| 2011/0248315 A1 | 10/2011 | Nam et al. |
| 2013/0299796 A1 | 11/2013 | Masuyama et al. |
| 2013/0323466 A1* | 12/2013 | Baca ............... C03C 17/245 428/141 |
| 2015/0103396 A1* | 4/2015 | Zollars .................. G02B 1/12 359/350 |
| 2015/0174625 A1* | 6/2015 | Hart .................. B08B 17/065 428/141 |
| 2018/0215660 A1* | 8/2018 | Liu .................. C03C 17/3655 |
| 2020/0139677 A1 | 5/2020 | Adib et al. |

FOREIGN PATENT DOCUMENTS

| | | |
|---|---|---|
| CN | 102171836 A | 8/2011 |
| CN | 103328176 A | 9/2013 |
| CN | 103534219 A | 1/2014 |
| CN | 106457758 A | 2/2017 |

OTHER PUBLICATIONS

International Search Report and Written Opinion of the International Searching Authority; PCT/US2020/025880; dated Jul. 27, 2020; 9 pages; European Patent Office.

* cited by examiner

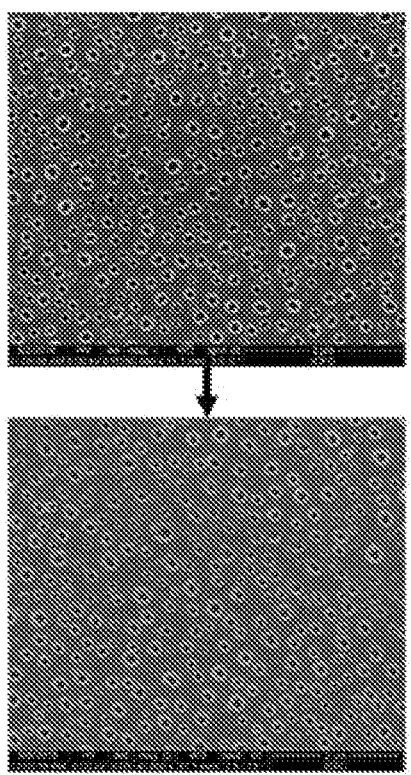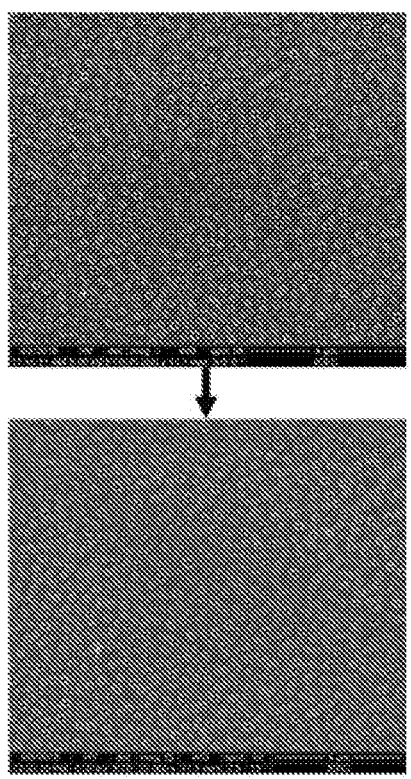
FIG. 7A                    FIG. 7B

ANTI-REFLECTIVE TRANSPARENT OLEOPHOBIC SURFACES AND METHODS OF MANUFACTURING THEREOF

CROSS-REFERENCE TO RELATED APPLICATIONS

This application claims the benefit of priority under 35 U.S.C. § 371 of International Application No. PCT/US2020/025880, filed on Mar. 31, 2020, which claims the benefit of priority under 35 U.S.C. § 119 of U.S. Provisional Application Ser. No. 62/832,410, filed on Apr. 11, 2019, the contents of which each of which are relied upon and incorporated herein by reference in their entirety.

BACKGROUND

1. Field

The disclosure relates to anti-reflective transparent oleophobic surfaces and methods of manufacturing thereof.

2. Technical Background

Antireflective surfaces may enhance performance of display devices, such as characteristics relating to screen clarity when observed under uneven light environments, or to transmission of transparent covers for optical devices (e.g., sensors, cameras, etc.) under difficult light conditions. In recent years, much effort has been applied to design optimized anti-reflective and self-cleaning surfaces. Complex micro-scale and nano-scale geometries in nature have been studied and developed, for example, biomimetic sub-wavelength structures inspired by the moth-eye or the lotus leaf, due to their optical performance and potential low cost.

Currently available commercial antireflective solutions include thin films based on destructive interference of multiple reflections. These technologies often suffer from narrow wavelength and angular response, sensitivity to film thickness variations, thermal expansion mismatch, reduced substrate adhesion and susceptibility to scratching. As a result, these films are unable to provide the desired range of optical properties (e.g., high optical transmission, low omnidirectional reflection, etc.) and wetting properties (e.g., superhydrophobicity, oleophobicity, etc.). Moreover, much effort has been made to create nanostructures in different materials; however, difficulties arise in commercial scalability because current technology is produced using expensive and time-consuming lithographic techniques.

This disclosure presents improved anti-reflective transparent oleophobic surfaces and methods of manufacturing thereof.

SUMMARY

The present disclosure can provide improved transparent oleophobic surfaces and methods of fabrication thereof having enhanced optical properties, mechanical resistance, and hydrophobicity. For example, surfaces of the present disclosure can be part of a new anti-reflective, low haze (e.g., less than 5%), transparent, hydrophobic (e.g., water contact angle greater than 135°) substrate based on nanostructures. Also, the transparent substrates with the surfaces described herein can exhibit high transmission (e.g., through transmission greater than 90%) and a low reflectance (e.g., less than 10% or less than 5%) to function as an anti-reflective article. Consequently the transparent substrate can have a structured surface that is both oleophobic and hydrophobic. The transparent substrate can be a structured polymer substrate and/or a structured glass substrate. For example, the substrate can be a structured glass substrate The structured substrate can have a structured array of surface features, wherein the structured array of surface features has at least one dimension in a range of 0.5 nm to 5000 nm. The structured array of surface features can occupy a surface area fraction in a range of 5% to 75% of the total polymer and/or glass surface area.

Methods of the present disclosure provide a novel lithography-free, scalable technique for fabricating the nanostructures in glass, polyimide, or other inorganic and organic (e.g., polymer) materials. Contemplated applications include self-cleaning and anti-reflective surfaces for display screens, solar panels, and automotive. Advantages of the surface and method of fabrication disclosed herein include: (1) a lithography-free, scalable, and time-saving process to nanostructure glass, polyimide, inorganic and organic crystals in general; and (2) improvements to optical, mechanical, and wetting properties of glass, polyimide, and polyimide on glass.

Methods include annealing a dewettable film disposed over a substrate to form a plurality of islands. The annealing can be a rapid thermal anneal (RTA), for example, conducted at a temperature in a range of 150° C. to 900° C. and for a time in a range of from 10 seconds to 1000 seconds. The islands can have at least one dimension in a range of 0.5 nm to 5000 nm. The plurality of islands can be crystallographically-oriented islands or randomly-distributed islands. A cross-sectional shape of at least a portion of the islands can be circular, oval, elliptical, or combinations thereof. Locations of the plurality islands can correspond to a footprint of the islands can correspond to footprints the structured array of surface features in the resulting article.

The dewettable film can have a thickness in a range of 10 Å to 500 Å. The dewettable coating can comprise one or more metals, alloys, metal oxides, polymers, organic materials, metal nitrides, or combinations thereof. In aspects, the dewettable film can include at least one of: Cu, Al, Ni, Cr, Ti, Au, Ag, Co, W, Pt, or combinations thereof. For example, the dewettable film can be copper. Alternatively, the dewettable film can include a polymer.

Methods further include forming a coating over the plurality of islands. The coating can be a dewettable coating of one or more metals, alloys, metal oxides, polymers, organic materials, metal nitrides, or combinations thereof. In aspects, the dewettable coating is at least one of: Cu, Al, Ni, Cr, Ti, Au, Ag, Co, W, Pt, or combinations thereof. For example, the coating (e.g., dewettable coating) can be nickel. Alternatively, the coating can be a polymer, for example, polyethylene terephthalate (PET), polyethylene naphthalate (PEN), polycarbonate (PC), polyimide (PI), or combinations thereof. For example, the coating can be polyimide (PI). The polymer coating can be cured in a two step process, for example, with a first curing at a first temperature in a range of from 50° C. to 200° C. for a first time in a range of from 30 seconds to 10 minutes and then a second curing at a second temperature in a range of from 150° C. to 300° C. for a second time in a range of from 5 minutes to 25 minutes, where the first temperature is less than the second temperature, and the first time is shorter than the second time.

Methods further include etching the plurality of islands to form a structured array of surface features in the coating. The etching can be a wet etch process, for example with an etchant including one or more of ammonium persulfate, FeCl$_3$ saturated solution, KCN, H$_2$O:HNO$_3$, HNO$_3$, NH$_4$OH:H$_2$O$_2$, HNO$_3$:H$_2$O$_2$, NH$_3$:H$_2$O$_2$, H$_3$PO$_4$:HNO$_3$: HAc, HNO$_3$:H$_2$SO$_4$:CrO$_3$:NH$_4$Cl:H$_2$O, or HCl:FeCl$_3$:H$_2$O.

Further, methods can include transferring the structured array of surface features from the coating to the substrate. The transferring can involve an anisotropic etch to a depth in a range of from 0.5 nm to 1000 nm in the substrate. For example, the anisotropic etch can be an anisotropic dry etch (e.g., reactive ion etching). To facilitate the transfer, the thickness of the coating can be less than a height of the plurality of islands. Consequently, the resulting structured substrate has nanostructures (e.g., cavities) that mirror the shape of the dewetted nanoparticle islands.

BRIEF DESCRIPTION OF THE DRAWINGS

The disclosure will become more fully understood from the following detailed description, taken in conjunction with the accompanying figures, in which:

FIGS. 7A and 7B illustrate SEM images of nanostructured polyimide on glass before (upper) and after (lower) the Crockmeter mechanical resistance test, according to some embodiments.

DETAILED DESCRIPTION

Figure 1A:
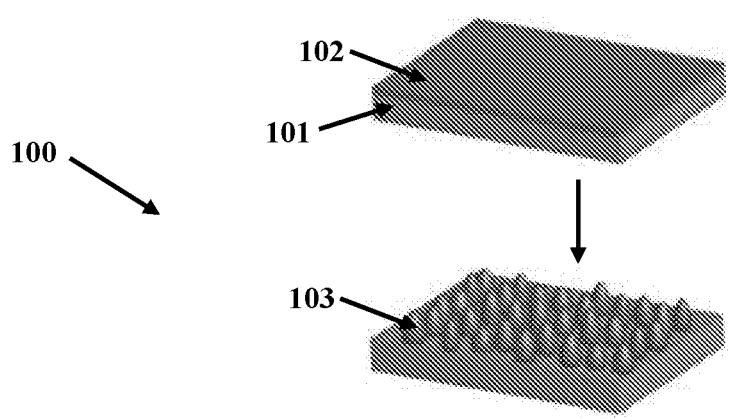
FIGS. 1A to 1D illustrate a structured polymer fabrication process, according to some embodiments.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments. It should be understood that the present application is not limited to the details or methodology set forth in the description or illustrated in the figures. It should also be understood that the terminology is for the purpose of description only and should not be regarded as limiting.

Additionally, any examples set forth in this specification are illustrative, but not limiting, and merely set forth some of the many possible embodiments of the claimed invention. Other suitable modifications and adaptations of the variety of conditions and parameters normally encountered in the field, and which would be apparent to those skilled in the art, are within the spirit and scope of the disclosure.

Referring now to the figures, FIGS. 1A to 1D illustrate a structured polymer fabrication process 100, according to some embodiments. In a first step of FIG. 1A, a transparent substrate 101 (e.g., glass, glass-ceramic, etc.) is uniformly deposited with an ultra-thin dewettable film 102. The substrate 101, for example, can include a borosilicate glass, an aluminosilicate glass, soda-lime glass, chemically strengthened borosilicate glass, chemically strengthened aluminosilicate glass, and chemically strengthened soda-lime glass. The substrate may have a selected length and width, or diameter, to define its surface area. The substrate 101 may also have a selected thickness. In some examples, the substrate 101 may have a thickness in a range of 0.2 mm to 1.5 mm, or 0.2 mm to 1.3 mm, or 0.2 mm to 1.0 mm, or 0.1 mm to 1.5 mm, or 0.1 mm to 1.3 mm, or 0.1 mm to 1.0 mm, or any range or value disposed therein.

In some examples, the substrate 101 includes a glass-ceramic material having both a glassy phase and a ceramic phase. Illustrative glass-ceramics include those materials where the glass phase is formed from a silicate, borosilicate, aluminosilicate, or boroaluminosilicate, and the ceramic phase is formed from β-spodumene, β-quartz, nepheline, kalsilite, or carnegieite. "Glass-ceramics" include materials produced through controlled crystallization of glass. In some examples, the glass-ceramics have about 30% to about 90% crystallinity. Examples of suitable glass-ceramics may include Li$_2$O—Al$_2$O$_3$—SiO$_2$ system (i.e., LAS-System) glass-ceramics, MgO—Al$_2$O$_3$—SiO$_2$ system (i.e., MAS-System) glass-ceramics, ZnO×Al$_2$O$_3$×nSiO$_2$ (i.e., ZAS system), and/or glass-ceramics that include a predominant crystal phase including β-quartz solid solution, β-spodumene, cordierite, and lithium disilicate. The glass-ceramic substrates may be strengthened using a chemical strengthening process.

In some examples, the film may have a thickness with a range of 1 Å to 10000 Å, or 2 Å to 5000 Å, or 3 Å to 2500 Å, or 5 Å to 1000 Å, or 10 Å to 500 Å, or 1 Å to 1000 Å, or 1 Å to 100 Å, or 100 Å to 1000 Å, or 1000 Å to 2500 Å, or 2500 Å to 5000 Å, or 5000 Å to 10000 Å, or 1 Å to 10 Å, or 5 Å to 75 Å, or 10 Å to 50 Å, or any range or value disposed therein. In some examples, film 102 may be deposited with at least one of: pulsed laser ablation, thermal evaporation, sputtering (e.g., magnetron sputtering, DC sputtering, AC sputtering, etc.), chemical vapor deposition (CVD), plasma-enhanced CVD, atomic layer deposition (ALD), electron-beam (E-beam) evaporation, or combinations thereof. In some examples, the film 102 may be selected from at least one of: metals (e.g., Cu, Al, Ni, Cr, Ti, Au, Ag, Co, W, Pt, etc.), alloys, metal oxides, polymers, organic materials, metal nitrides, or combinations thereof. In some examples, the deposition may be conducted for a time in a range of 1 sec. to 600 sec., or 1 sec. to 300 sec., or 1 sec. to 100 sec., or 100 sec. to 300 sec., or 300 sec. to 600 sec., or 1 sec. to 60 sec., or 1 sec. to 30 sec., or 1 sec. to 10 sec., or 10 sec. to 30 sec., or 30 sec. to 60 sec., or 1 sec. to 5 sec., or any range or value disposed therein.

Figure 1B:
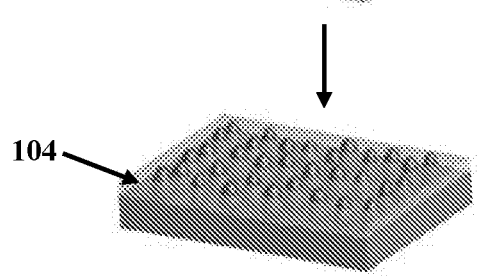

Thereafter, in a second step of FIG. 1B, film 102 may be subjected to a thermal dewetting process to form islands 103 having controlled geometries. In other words, thermal annealing-induced morphological evolution of ultra-thin dewettable films may be used to pattern film 102 on substrate 101 to obtain an ordered array of crystallographically-oriented or randomly-distributed nanoparticle or microparticle islands 103. The deposition techniques as in FIG. 1A may function to impose a constraint on the size and number density of the islands post-thermal dewetting sue to formation of a semi-continuous or continuous film for longer deposition times that result in a broad or no localized surface plasmon resonance (LSPR) response. Thus, transformation of such semi-continuous or continuous thin films (e.g., film 102) into random island films is possible by post-deposition thermal dewetting. In some examples, a cross-sectional shape of the islands (or at least a portion thereof) taken from an axis parallel to the substrate 101 may be approximately at least one of circular, oval, elliptical, Cassini oval, Cartesian oval, egg-shaped, or combinations thereof.

In some examples, thermal dewetting may be carried out via rapid thermal annealing at temperatures in a range of 100° C. to 1000° C., or 100° C. to 250° C., or 250° C. to 500° C., or 500° C. to 750° C., or 750° C. to 1000° C., or 150° C. to 900° C., or any range or value disposed therein, for a time in a range of 1 sec. to 60 sec., or 1 sec. to 30 sec., or 1 sec. to 10 sec., or 10 sec. to 30 sec., or 30 sec. to 60 sec., or 1 sec. to 5 sec., or 10 sec. to 1000 sec., or 10 sec. to 750 sec., or 10 sec. to 500 sec., or 10 sec. to 250 sec., or 10 sec. to 100 sec., or any range or value disposed therein. Before thermal dewetting, the chamber was pumped and purged with nitrogen gas several times to ensure adequate purity. In some examples, forming gas may be flown into the chamber to prevent samples from contamination during thermal treatment. After annealing, samples were cooled to room temperature in the furnace. In some examples, the islands may have at least one dimension (e.g., height, cross-sectional diameter, etc.) in a range of 0.5 nm to 5000 nm, or 0.5 nm to 4000 nm, or 0.5 nm to 3000 nm, or 0.5 nm to 2000 nm, 0.5 nm to 1000 nm, or 0.5 nm to 750 nm, or 0.5 nm to 500 nm, or 0.5 nm to 250 nm, or 50 nm to 1000 nm, or 100 nm to 1000 nm, or 250 nm to 1000 nm, or 500 nm to 1000 nm, or 750 nm to 1000 nm, or 0.5 nm to 100 nm, or 0.5 nm to 50 nm, or 0.5 nm to 25 nm, or 1 nm to 25 nm, or 5 nm to 20 nm, or 50 nm to 150 nm, or 1 nm to 10 nm, or 10 nm to 100 nm, or 100 nm to 250 nm, or 250 nm to 500 nm, or 500 nm to 750 nm, or any range or value disposed therein.

Figure 1C:
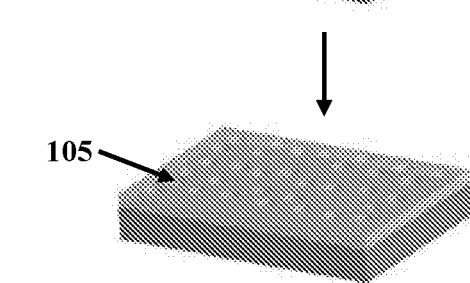

Thereafter, in a third step of FIG. 1C, a polymer coating 104 is disposed over the substrate 101 and islands 103. In some examples, the thickness of coating 104 is less than a height of the islands 103 to leave a portion of the islands exposed. In some examples, the thickness of coating 104 is roughly equivalent to a height of the islands 103. In some examples, the thickness of coating 104 is greater than a height of the islands 103 to completely bury the islands within the coating. In some examples, a thickness of the coating 104 varies in a range of 10 nm to 1000 nm. In some examples, the coating 104 may be at least one of polyethylene terephthalate (PET), polyethylene naphthalate (PEN), polycarbonate (PC), polyimide (PI), metal oxides, glass materials, semiconductor materials, or combinations thereof and deposited via at least one of spin-coating, dip coating, plating (e.g., electroplating), sol-gel, Langmuir-Blodgett method, chemical vapor deposition (CVD), plasma-enhanced CVD (PECVD), atomic layer deposition (ALD), or combinations thereof.

After positioning the coating 104 to cover at least a portion of the islands, the entire structure is cured. The curing process is critical for defining the properties of the polymeric film. In some examples, the curing process comprises a first curing step and a second curing step. In the first curing step, the structure may be heated to a first temperature in a range of 50° C. to 200° C., or 60° C. to 190° C., or 70° C. to 180° C., or 80° C. to 170° C., or 90° C. to 160° C., or 100° C. to 150° C., or 50° C. to 100° C., or 75° C. to 125° C., or 125° C. to 175° C., or 150° C. to 200° C., or 80° C. to 120° C., or 85° C. to 115° C., or any range or value disposed therein, for a first time in a range of 30 sec to 10 min, or 1 min to 7 min, or 1.5 min to 5 min, or 2 min to 4 min, or 30 sec to 5 min, or any range or value disposed therein. In the second curing step, the structure may be heated to a second temperature in a range of 150° C. to 300° C., or 160° C. to 290° C., or 170° C. to 280° C., or 180° C. to 270° C., or 190° C. to 260° C., or 200° C. to 250° C., or 150° C. to 200° C., or 175° C. to 225° C., or 225° C. to 275° C., or 250° C. to 300° C., or 180° C. to 220° C., or 185° C. to 215° C., or any range or value disposed therein, for a second time in a range of 5 min to 25 min, or 8 min to 22 min, or 11 min to 19 min, or 5 min to 8 min, or 8 min to 11 min, or 11 min to 14 min, or 14 min to 17 min, or 17 min to 20 min, or 20 min to 25 min, or 10 min to 20 min, or 13 min to 17 min, or any range or value disposed therein.

In some examples, the first temperature is less than the second temperature, or the first temperature is approximately equal to the second temperature, or the first temperature is greater than the second temperature. In some examples, the first time is less than the second time, or the first time is approximately equal to the second time, or the first time is greater than the second time. In some examples, the first curing step and the second curing step are performed consecutively, or with an intervening processing step therebetween.

Figure 1D:
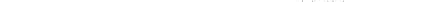

Thereafter, in a fourth step of FIG. 1D, the islands 103 may be etched to form a relatively structured array of features 105 (e.g., hole, indentation, cavities, etc.) in the coating 104 having a footprint at the locations of the previously positioned islands 103. In some examples, the features may have at least one dimension (e.g., depth, diameter, etc.) in a range of 0.5 nm to 5000 nm, or 0.5 nm to 4000 nm, or 0.5 nm to 3000 nm, or 0.5 nm to 2000 nm, or 0.5 nm to 1000 nm, or 0.5 nm to 750 nm, or 0.5 nm to 500 nm, or 0.5 nm to 250 nm, or 50 nm to 1000 nm, or 100 nm to 1000 nm, or 250 nm to 1000 nm, or 500 nm to 1000 nm, or 750 nm to 1000 nm, or 0.5 nm to 100 nm, or 0.5 nm to 50 nm, or 0.5 nm to 25 nm, or 1 nm to 25 nm, or 5 nm to 20 nm, or 50 nm to 150 nm, or 1 nm to 10 nm, or 10 nm to 100 nm, or 100 nm to 250 nm, or 250 nm to 500 nm, or 500 nm to 750 nm, or any range or value disposed therein.

In some examples, the etching may be a wet etch comprising at least one of ammonium persulfate, $FeCl_3$ saturated solution, KCN, $H_2O:HNO_3$, $HNO_3$, $NH_4OH:H_2O_2$, $HNO_3:H_2O_2$, $NH_3:H_2O_2$, $H_3PO_4:HNO_3:HAc$, $HNO_3:H_2SO_4:CrO_3:NH_4Cl:H_2O$, $HCl:FeCl_3:H_2O$, or combinations thereof. In some examples, the etching may be a dry vapor etch, such as plasma etching with oxygen plasma.

Turning now to FIGS. 2A to 2E, which illustrate a structured glass fabrication process, according to some embodiments. Specifically, the first step of FIG. 2A, where a transparent substrate 201 is uniformly deposited with an ultra-thin dewettable film 202, and the second step of FIG. 2B, where film 202 is subjected to a thermal dewetting process to form islands 203 having controlled geometries, may be performed with the conditions and/or materials as described above in FIGS. 1A and 1B.

Figure 2A:
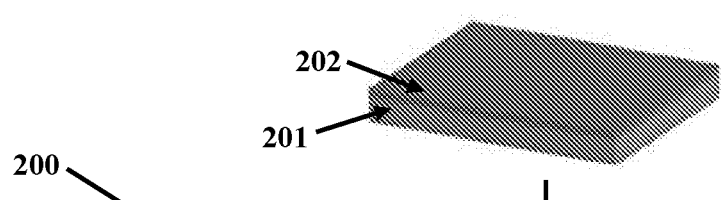
FIGS. 2A to 2E illustrate a structured glass fabrication process, according to some embodiments.
Figure 2B:
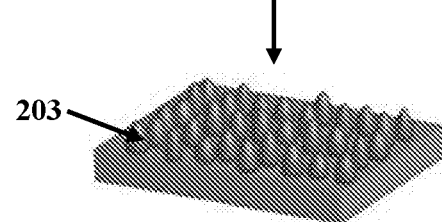
Figure 2C:
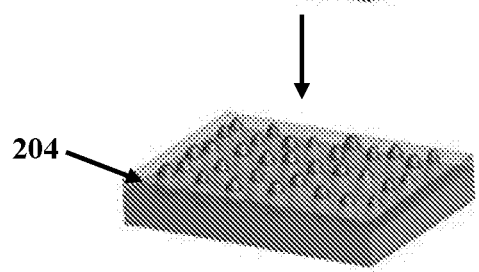

Thereafter, in a third step of FIG. 2C, a dewettable coating 204 is disposed over the substrate 201 and islands 203. In some examples, the thickness of coating 204 is less than a height of the islands 203 to leave a portion of the islands exposed. In some examples, the thickness of coating 204 is roughly equivalent to a height of the islands 203. In some examples, the thickness of coating 204 is greater than a height of the islands 203 to completely bury the islands within the coating. In some examples, a thickness of the coating 204 varies in a range of 10 nm to 1000 nm. In some examples, the coating 204 may be at least one of metals (e.g., Cu, Al, Ni, Cr, Ti, Au, Ag, Co, W, Pt, etc.), alloys, metal oxides, polymers, organic materials, metal nitrides, or combinations thereof and deposited similarly (e.g., apparatus, etc.) as film 202. For example, coating 204 may be deposited with at least one of: pulsed laser ablation, thermal evaporation, sputtering (e.g., magnetron sputtering, DC sputtering, AC sputtering, etc.), chemical vapor deposition (CVD), plasma-enhanced CVD, atomic layer deposition (ALD), electron-beam (E-beam) evaporation, or combinations thereof for a time in a range of 1 sec. to 600 sec., or 1 sec. to 300 sec., or 1 sec. to 100 sec., or 100 sec. to 300 sec., or 300 sec. to 600 sec., or 1 sec. to 60 sec., or 1 sec. to 30 sec., or 1 sec. to 10 sec., or 10 sec. to 30 sec., or 30 sec. to 60 sec., or 1 sec. to 5 sec., or any range or value disposed therein.

Figure 2D:
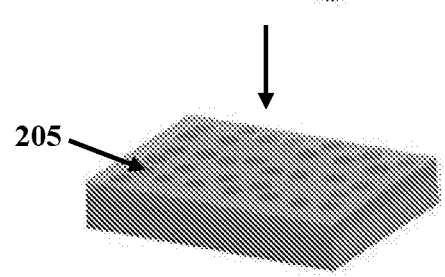

Thereafter, in a fourth step of FIG. 2D, where the islands 203 are etched to form a relatively structured array of features 205 (e.g., hole, indentation, cavities, etc.) in the coating 204 having a footprint at the locations of the previously positioned islands 203, may be performed with the conditions and/or materials as described above in FIG. 1D.

Figure 2E:
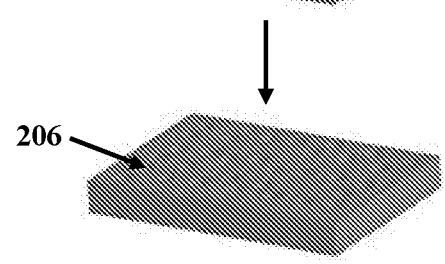

Thereafter, in a fifth step of FIG. 2E, the structured array of features 205 in the coating 204 may be transferred to the substrate 201 to form pattern 206. In some examples, the transfer process comprises an isotropic wet etch. In some examples, the transfer process comprises an anisotropic dry etch (e.g., reactive ion etching, RIE). In some examples, the etch may be conducted to a depth having a range of 0.5 nm to 1000 nm, or 0.5 nm to 750 nm, or 0.5 nm to 500 nm, or 0.5 nm to 250 nm, or 50 nm to 1000 nm, or 100 nm to 1000 nm, or 250 nm to 1000 nm, or 500 nm to 1000 nm, or 750 nm to 1000 nm, or 0.5 nm to 100 nm, or 0.5 nm to 50 nm, or 0.5 nm to 25 nm, or 1 nm to 25 nm, or 5 nm to 20 nm, or 1 nm to 10 nm, or 10 nm to 100 nm, or 100 nm to 250 nm, or 250 nm to 500 nm, or 500 nm to 750 nm, or any range or value disposed therein, into the substrate 201.

Finally, after the step of pattern transfer, the coating 204 may be etched to remove the residual mask. In some examples, the etching may be a wet etch comprising at least one of $HNO_3$:HAc:acetone, $HF$:$HNO_3$, $FeCl_3$, $HNO_3$:$H_2SO_4$:HAc:$H_2O$, $HNO_3$:$H_2O$, $HNO_3$:HAc, $Ce(NH_4)_2(NO_3)_6$:$H_2O$, $HF$, $H_3PO_4$, $HNO_3$, $HF$:$HNO_3$, $HCl$:$HNO_3$, $2NH_4NO_3 \cdot Ce(NO_3)_3 \cdot 4(H_2O)$:$HNO_3$:$H_2O$, $H_3PO_4$:$HNO_3$:$CH_3COOH$:$H_2O$, or combinations thereof. In some examples, the etching may be a dry vapor etch, such as plasma etching with oxygen plasma.

Thus, as provided herein, processes are disclosed to form structured polymers and structured glasses comprising features having at least one dimension (e.g., diameter, depth, or combinations thereof) in a range of or 0.5 nm to 5000 nm, or 0.5 nm to 4000 nm, or 0.5 nm to 3000 nm, or 0.5 nm to 2000 nm, 0.5 nm to 1000 nm, or 0.5 nm to 750 nm, or 0.5 nm to 500 nm, or 0.5 nm to 250 nm, or 50 nm to 1000 nm, or 100 nm to 1000 nm, or 250 nm to 1000 nm, or 500 nm to 1000 nm, or 750 nm to 1000 nm, or 0.5 nm to 100 nm, or 0.5 nm to 50 nm, or 0.5 nm to 25 nm, or 1 nm to 25 nm, or 5 nm to 20 nm, or 50 nm to 150 nm, or 1 nm to 10 nm, or 10 nm to 100 nm, or 100 nm to 250 nm, or 250 nm to 500 nm, or 500 nm to 750 nm, or any range or value disposed therein.

Moreover, the nanostructures formed on the surface of the polymers (e.g., FIG. 1D) and/or the surface of the glass substrate (e.g., FIG. 2E) comprise a surface area fraction in a range of 1% to 50%, or 5% to 45%, or 10% to 40%, or 15% to 35%, or 20% to 30%, or 1% to 10%, or 10% to 20%, or 20% to 30%, or 30% to 40%, or 40% to 50%, or 1% to 99%, or 2% to 90%, or 5% to 75%, or 10% to 60%, or any range or value disposed therein.

As a result of the formed structured polymers and structured glasses, the resultant final structure (e.g., FIG. 1D and/or FIG. 2E) comprise optical properties of at least one of: (1) transmission through structure as greater than 80%, or greater than 85%, or greater than 90%, or greater than 95%, or greater than 99%, or greater than 99.5%; or (2) haze of the structured surface as being less than 10%, or less than 5%, or less than 2.5%, or less than 1.0%, or less than 0.5%, or less than 0.25%; or (3) reflection of the structured surface as being less than 10%, or less than 5%, or less than 2.5%, or less than 1.0%, or less than 0.5%, or less than 0.25%; or (4) water contact angle of the structured surface (after fluorosilane treatment) as being greater than 100°, or greater than 110°, or greater than 120°, or greater than 130°, or greater than 135°, or greater than 140°, or greater than 145°, or greater than 150°, or greater than 155°, or greater than 160°; or (5) a combination of (1), (2), (3) and/or (4).

EXAMPLES

The embodiments described herein will be further clarified by the following examples.

Nanostructured Polyimide Fabrication Process

Double-side, optically-polished, ultraviolet (UV)-fused silica glass substrates having a thickness of about 1 mm and an area of about 1 sq.in. were utilized. The substrate surfaces were first cleaned in acetone for about 10 min, followed by an ethanol ultrasonic bath, also for about 10 min. The substrates were then rinsed in deionized (DI) water and dried with nitrogen gas. An ultra-thin metal film of copper was deposited using a magnetron sputtering system (ATC Orion 8, AJA International, Inc.).

For example, the sputtering system comprises a computer-controlled fully automatic RF/DC deposition system with co-planar configuration and may have at least two different target materials installed at the same time. The target size diameter is 2 inches and the system reaches thickness uniformity of about 2.5% over 4-inch diameter substrates. Moreover, there may be an integrated load lock system for sample transfer without breaking the vacuum of the main chamber. The to-be-coated substrates may optionally be subjected to co-sputtering, as the sputtering system includes multiple radio-frequency (RF) and multiple direct current (DC) power sources. The sputtering system also allows deposition at higher temperature (e.g., up to 800° C.) and comprises an oxygen reactive gas line, apart from an argon processing gas line. Substrates are placed on a rotating sample holder that spin around an axis of the chamber up to a maximum rotation frequency of 40 revolutions/min. The main chamber is connected to a turbo pump which reaches a base vacuum level of $5 \times 10^{-8}$ Torr, while the load lock is pumped by a smaller rotary pump.

Thereafter, the copper-coated substrates were annealed to high temperatures in a range of 600° C. to 750° C. to create nanoparticles by a rapid thermal annealing system (RTP-150-HV, Unitemp GmbH). High purity nitrogen gas was included as part of the anneal to prevent oxidation of the copper film at an environment pressure of about 1 atm. By controlling thickness of the deposited metal as well as the temperature and time of the annealing process, it is possible to define the geometry of the nanoparticles formed by dewetting.

After formation of the nanoparticle islands, diluted polyimide (CP1 Polyimide, Nexolve Materials) in N-methyl-2-pyrrolidone (NMP) was spun coated, covering the whole substrate and partially covering a portion of the nanoparticles. An APS ((3-aminopropyl)triethoxysilane) promoter may be used to improve adhesion of the PI layer to the substrate via silicon-oxygen bonds. The thickness of the deposited polymer films may be controlled by variation of polymer (PI) concentration in solution (NMP) as well as varying the process parameters of the deposition apparatus (G3P Spin Coater, Specialty Coating Systems). For example, the spin coater may be spun at a rotational speed in a range of 1000 rpm to 5000 rpm, for a time in a range of 50 sec to 100 sec, and at a ramp time ranging from 5 sec to 15 sec. After completion of deposition, PI polymer is cured in a two-step process, first at about 100° C. for 3 min and subsequently at about 200° C. for 15 min, both of which were conducted on a standard hot plate. As a final step, the copper nanoparticle islands were chemically etched using a 5% solution of ammonium persulfate in water for a time in a range of 10 min to 300 min, leaving a uniform nanostructured PI surface.

Nanostructured Glass Fabrication Process

Double-side, optically-polished, ultraviolet (UV)-fused silica glass substrates having a thickness of about 1 mm and an area of about 1 sq.in. were utilized. The substrate surfaces were first cleaned in acetone for about 10 min, followed by an ethanol ultrasonic bath, also for about 10 min. The substrates were then rinsed in deionized (DI) water and dried with nitrogen gas. An ultra-thin metal film of copper was deposited using a magnetron sputtering system (explained above). Thereafter, the copper-coated substrates were annealed to high temperatures in a range of 600° C. to 750° C. to create nanoparticles by a rapid thermal annealing system (explained above). High purity nitrogen gas was included as part of the anneal to prevent oxidation of the copper film at an environment pressure of about 1 atm. By controlling thickness of the deposited metal as well as the temperature and time of the annealing process, it is possible to define the geometry of the nanoparticles formed by dewetting.

Subsequently, a thin film of nickel was deposited by sputtering atop the copper nanoparticles, filling the gaps therebetween, to a height less than a height of the copper nanoparticles. The copper nanoparticles were chemically etched using a 5% solution of ammonium persulfate in water, leading to a nano-hole patterned coating of nickel with sufficient thickness to use as a mask for a dry etch. A RIE system (Plasmalab System 100, Oxford Instruments) was used in a dry etch to transfer the nanostructured array of features in the nickel coating to the substrate surface to form a pattern mirroring the pattern of the dewetted copper particles. Etching was performed at 300 W RF power (745 DC voltage) at 10 mTorr in 40 sccm Ar/5 sccm $CHF_3$ plasma. Finally, the samples were immersed in an aqua regia etchant (mixture of water, hydrochloric acid and nitric acid—2:3:1 by volume) to remove the residual nickel metal mask.

Figure 3A:
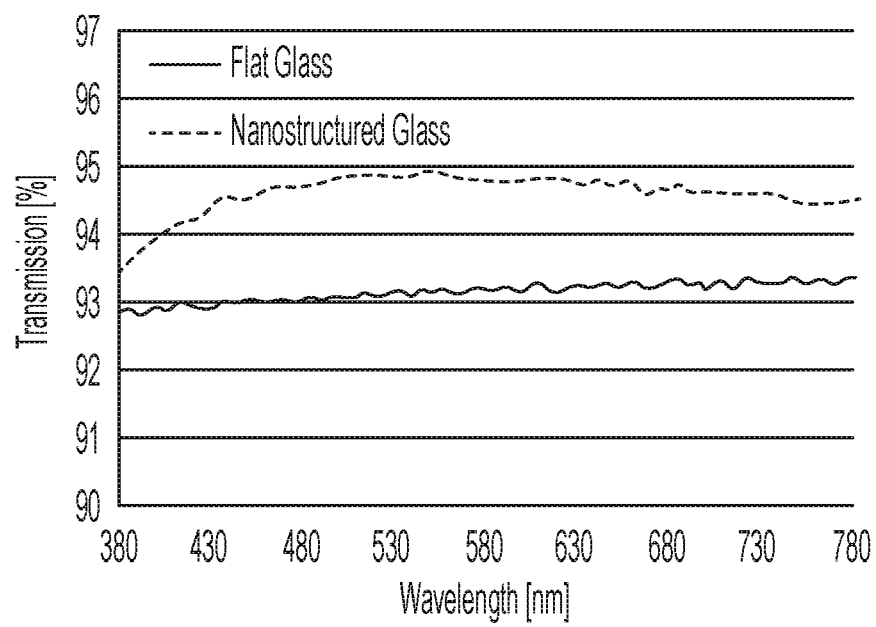
FIGS. 3A and 3B illustrate optical comparisons between bare fused silica glass and nanostructured glass, according to some embodiments.
Figure 3B:
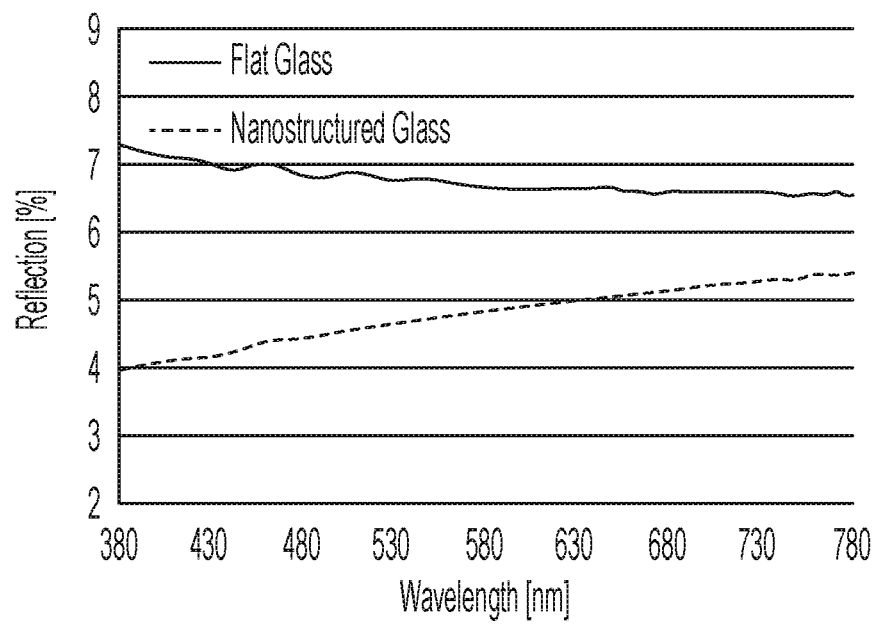

FIGS. 3A and 3B illustrate optical comparisons (antireflective effects) between bare fused silica glass and nanostructured glass, according to some embodiments. Specifically, the nanostructured effects on glass results in a higher transmission (FIG. 3A) and lower reflection (FIG. 3B) of the glass than when compared with bare glass that does not have nanostructuring. Thus, nanostructuring only one surface makes it possible to reduce reflection by almost half, thereby indicating antireflective effect of the nanostructures.

Figure 4A:
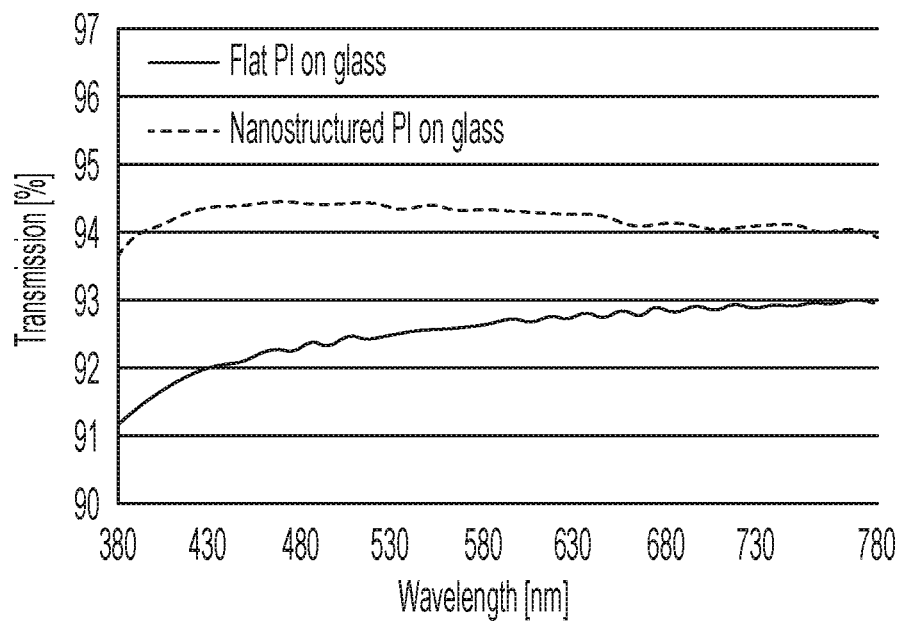
FIGS. 4A and 4B illustrate optical comparisons between flat polyimide (PI) on glass and nanostructured polyimide on glass, according to some embodiments.
Figure 4B:
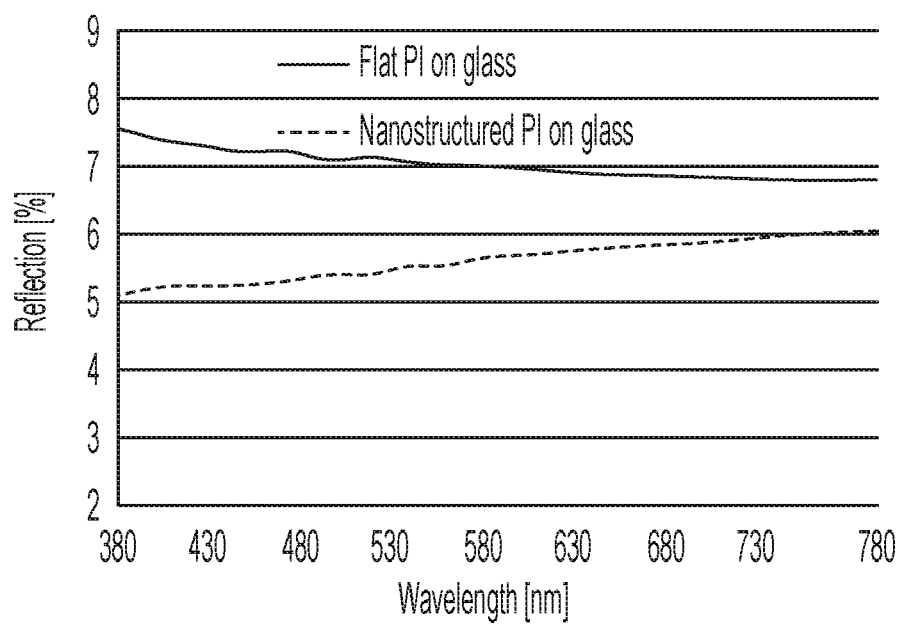

FIGS. 4A and 4B illustrate optical comparisons (antireflective effects) between flat polyimide (PI) on glass and nanostructured polyimide on glass, according to some embodiments. Specifically, the nanostructured effects on polyimide results in a higher transmission (FIG. 4A) and lower reflection (FIG. 4B) of the polyimide on glass than when compared with flat polyimide on glass that does not have nanostructuring. Thus, even with deposition of a higher refractive index material on top of glass, nanostructuring the polyimide make it possible to reduce the bare glass reflection, combining the advantage of having PI on glass and introducing an antireflective effect.

The antireflective effect of the disclosed nanostructures is based on a smooth refractive index gradient between the air-nanostructured surface interface. Creating sub-wavelength structures, light scattering becomes negligible, thereby preserving directionality of the transmitted beams (e.g., visible light as shown in FIGS. 3A to 4B). Modifying geometry and size of the nanostructures allows for optimization of the antireflective effect for different and wider wavelength ranges, while the angular response (i.e., omni-directionality), is improved compared with the antireflective multilayer coatings.

Figure 5A:
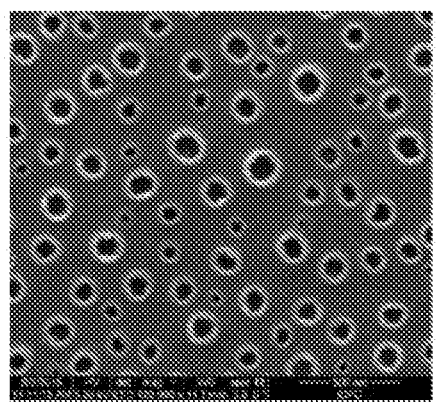
FIGS. 5A to 5C illustrate scanning electron microscope (SEM) images of nanostructured polyimide on glass, according to some embodiments.
Figure 5B:
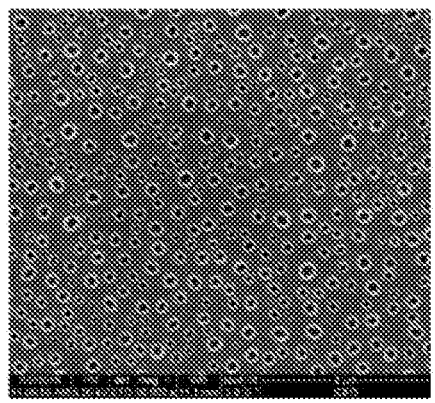
Figure 5C:
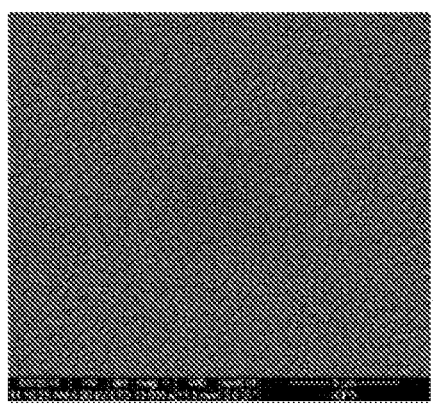
Figure 6A:
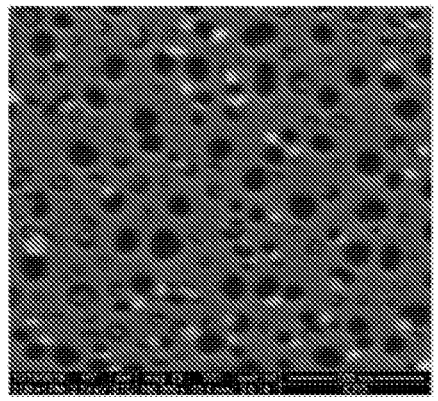
FIGS. 6A to 6C illustrate SEM images of nanostructured glass, according to some embodiments.
Figure 6B:
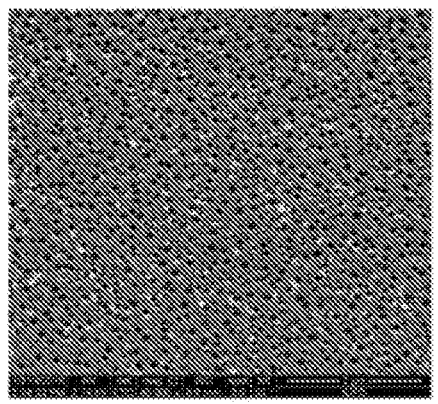
Figure 6C:
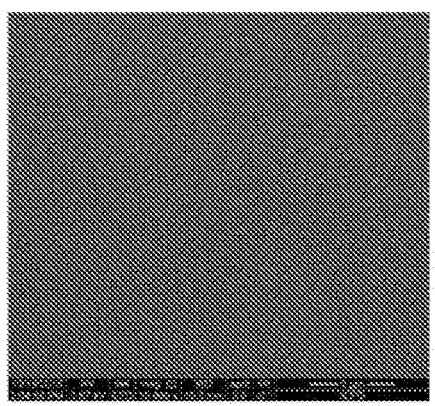

FIGS. 5A to 5C illustrate SEM images of nanostructured polyimide on glass at 120 k (FIG. 5A), 50 k (FIG. 5B), and 13 k (FIG. 5C) magnification, according to some embodiments. FIGS. 6A to 6C illustrate SEM images of nanostructured glass at 160 k (FIG. 6A), 40 k (FIG. 6B), and 10 k (FIG. 6C) magnification, according to some embodiments. In both cases, visual evidence is provided of the formed nanostructures (e.g., cavities) that mirror the shape of the dewetted nanoparticle islands as explained in the fabrication process. The nanostructured polyimide on glass may be formed by the process of FIGS. 1A to 1D; the nanostructured glass may be formed by the process of FIGS. 2A to 2E.

FIGS. 7A (and 7B illustrate SEM images of nanostructured polyimide on glass before (upper) and after (lower) the TABER® Crockmeter test, which can be used to test smudge and smear resistance, as well as rub abrasion, scuff and/or mar performance of surfaces. In one implementation, mechanical resistance was tested by rubbing a standard rubbing textile (e.g., microfiber cloth) over a two-squared centimeter nanostructured surface area at a constant force of 9N. As is seen in FIGS. 7A and 7B, the integrity of the nanostructured polyimide on glass surface remains intact both before (upper) and after (lower) conducting the Crockmeter test, thereby indicating sufficient mechanical resistance of the article upon application of shear and compression forces.

Figure 8:
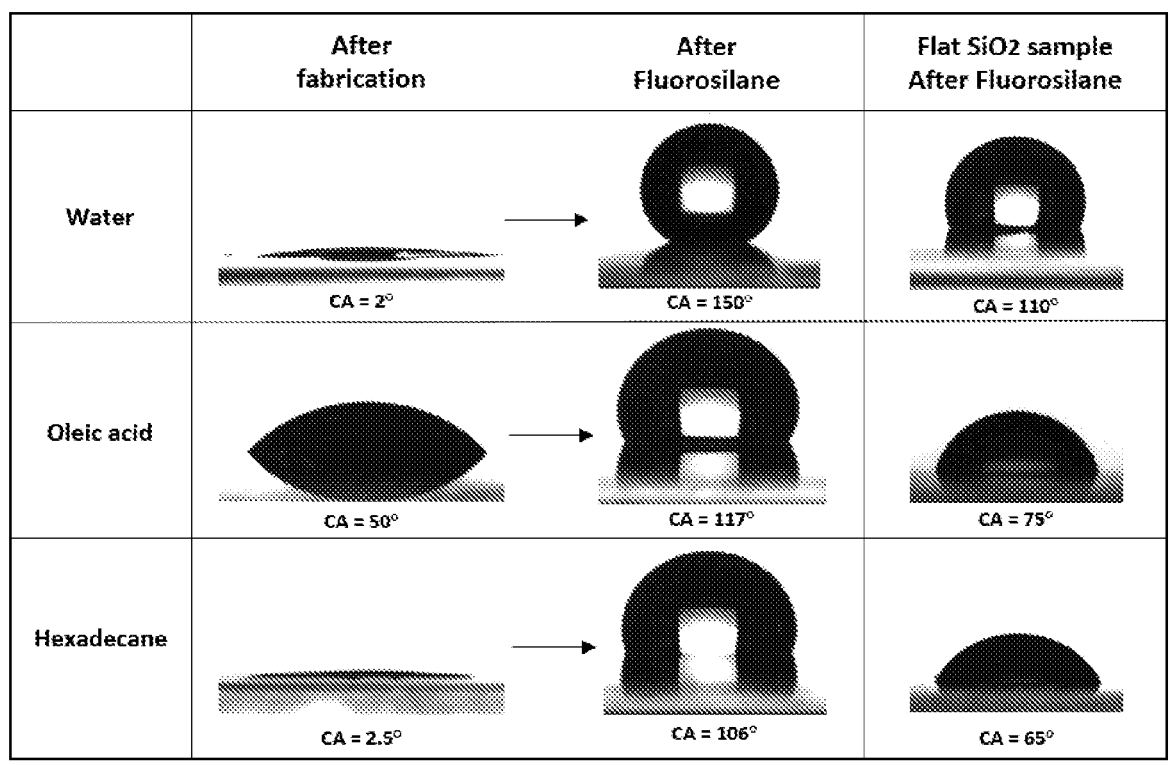
FIG. 8 illustrates wetting properties of nanostructured glass, according to some embodiments.

FIG. 8 illustrates wetting properties of nanostructured glass, according to some embodiments. Contact angles for water, oleic acid and hexadecane were measured on nanostructured glass before coating ("after fabrication") and after coating ("after fluorosilane") its surface with a low surface tension fluorosilane self-assembled monolayer. For reference, contact angles were also measured on flat glass (i.e., non-nanostructured glass; "flat $SiO_2$ sample after fluorosilane") to determine and compare effects of nanostructuring on hydrophobicity. It is seen that not only does fluorosilane enhance hydrophobicity of the nanostructured glass, but that creating these subwavelength nanostructures allows for achieving superhydrophobicity and oleophobicity, much more so than flat glass. Thus, nanostructured surfaces, when coated with a low surface tension fluorosilane self-assembled monolayer, may become superhydrophobic and oleophobic with very low contact angle hysteresis (difference between the advancing and receding contact angle).

Thus, as provided herein, improved transparent oleophobic surfaces are disclosed and methods of fabrication thereof having enhanced optical properties, mechanical resistance, and hydrophobicity. In other words, a new anti-reflective, low haze, transparent, hydrophobic substrate based on nanostructures is disclosed. Moreover, a novel lithography-free, scalable technique for fabricating the nanostructures in glass, polyimide, or other inorganic and organic (polymer)

materials is also disclosed. Contemplated applications include self-cleaning and anti-reflective surfaces for display screens, solar panels, and automotive. Advantages of the surface and method of fabrication disclosed herein include: (1) a lithography-free, scalable, and time-saving process to nanostructure glass, polyimide, inorganic and organic crystals in general; and (2) improvements to optical, mechanical, and wetting properties of glass, polyimide, and polyimide on glass.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As utilized herein, "optional," "optionally," or the like are intended to mean that the subsequently described event or circumstance can or cannot occur, and that the description includes instances where the event or circumstance occurs and instances where it does not occur. The indefinite article "a" or "an" and its corresponding definite article "the" as used herein means at least one, or one or more, unless specified otherwise.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A method for fabricating a structured surface, comprising:
   providing a transparent substrate;
   disposing a dewettable film over the transparent substrate;
   annealing the dewettable film to form a plurality of islands;
   forming a coating over the plurality of islands, a thickness of the coating is less than a height of the plurality of islands to leave a portion of the plurality of islands exposed;
   etching the plurality of islands to form a structured array of surface features in the coating;
   transferring the structured array of surface features from the coating to the transparent substrate; and
   removing the coating from the transparent substrate.

2. The method of claim 1, wherein the dewettable film has a thickness in a range of 10 Å to 500 Å.

3. The method of claim 1, wherein the dewettable film is at least one of: metals, alloys, metal oxides, polymers, organic materials, metal nitrides, or combinations thereof.

4. The method of claim 1, wherein the dewettable film is at least one of: Cu, Al, Ni, Cr, Ti, Au, Ag, Co, W, Pt, or combinations thereof.

5. The method of claim 1, wherein:
   the plurality of islands is an ordered array of crystallographically-oriented or randomly-distributed islands, and
   at least a portion of an island of the plurality of islands have a cross-sectional shape from an axis parallel to the transparent substrate of at least one of: circular, oval, elliptical, Cassini oval, Cartesian oval, egg-shaped, or combinations thereof.

6. The method of claim 1, wherein the annealing is a rapid thermal anneal (RTA) conducted at a temperature in a range of 150° C. to 900° C. and for a time in a range of 10 sec to 1000 sec.

7. The method of claim 1, wherein an island of the plurality of islands has at least one dimension in a range of 0.5 nm to 5000 nm.

8. The method of claim 1, wherein the coating is a polymer coating comprising at least one of: polyethylene terephthalate (PET), polyethylene naphthalate (PEN), polycarbonate (PC), polyimide (PI), or a metal oxide coating, or a glass material coating, or a semiconductor material coating, or combinations thereof.

9. The method of claim 8, wherein the forming the coating comprises:
   a first curing conducted at a first temperature in a range of 50° C. to 200° C. for a first time in a range of 30 sec to 10 min; and then
   a second curing conducted at a second temperature in a range of 150° C. to 300° C. for a second time in a range of 5 min to 25 min,
   wherein the first temperature is less than the second temperature, and
   wherein the first time is shorter than the second time.

10. The method of claim 1, wherein the coating is a dewettable coating comprising at least one of: Cu, Al, Ni, Cr, Ti, Au, Ag, Co, W, Pt, or combinations thereof.

11. The method of claim 1, wherein the etching is a wet etch process comprising at least one of: ammonium persulfate, $FeCl_3$ saturated solution, KCN, $H_2O:HNO_3$, $HNO_3$, $NH_4OH:H_2O_2$, $HNO_3:H_2O_2$, $NH_3:H_2O_2$, $H_3PO_4:HNO_3$:HAc, $HNO_3:H_2SO_4:CrO_3:NH_4Cl:H_2O$, $HCl:FeCl_3:H_2O$, or combinations thereof.

12. The method of claim 1, wherein the structured array of surface features has a footprint at locations of the plurality of islands.

13. The method of claim 1, wherein the structured array of surface features has at least one dimension in a range of 0.5 nm to 5000 nm.

14. The method of claim 1, wherein the transferring is conducted by an anisotropic etch and wherein the anisotropic etch is conducted to a depth into the transparent substrate having a range of 0.5 nm to 1000 nm.

15. The method of claim 1, wherein the removing is a wet etch process comprising at least one of: $HNO_3:HAc:acetone$, $HF:HNO_3$, $FeCl_3$, $HNO_3:H_2SO_4:HAc:H_2O$, $HNO_3:H_2O$, $HNO_3:HAc$, $Ce(NH_4)_2(NO_3)_6:H_2O$, HF, $H_3PO_4$, $HNO_3$, $HF:HNO_3$, $HCl:HNO_3$, $2NH_4NO_3 \cdot Ce(NO_3)_3 \cdot 4(H_2O)$: $HNO_3:H_2O$, $H_3PO_4:HNO_3:CH_3COOH:H_2O$, or combinations thereof.

16. The method of claim 1, wherein the dewettable film comprises a polymer.

17. The method of claim 1, wherein the transparent substrate comprises glass, and the transparent substrate with the structured surface exhibits a reflection of less than 5%.

* * * * *